(12) United States Patent
Meissner et al.

(10) Patent No.: US 11,415,671 B2
(45) Date of Patent: Aug. 16, 2022

(54) INTERFERENCE DETECTION AND MITIGATION FOR LIDAR SYSTEMS

(71) Applicant: Infineon Technologies AG, Neubiberg (DE)

(72) Inventors: Paul Meissner, Feldkirchen bei Graz (AT); Michiel Helsloot, HD's-Hertogenbosch (NL); Alexander Melzer, Neutillmitsch (AT); Vladimir Petrovic, Eindhoven (NL); Christoph Steiner, St. Margarethen (AT); Hendrikus Van Lierop, BJ Weert (NL)

(73) Assignee: Infineon Technologies AG

( * ) Notice: Subject to any disclaimer, the term of this patent is extended or adjusted under 35 U.S.C. 154(b) by 414 days.

(21) Appl. No.: 16/689,697

(22) Filed: Nov. 20, 2019

(65) Prior Publication Data

US 2020/0158825 A1    May 21, 2020

(30) Foreign Application Priority Data

Nov. 21, 2018   (DE) .......................... 102018129246.5

(51) Int. Cl.
  *G01C 3/08*   (2006.01)
  *G01S 7/48*   (2006.01)
(52) U.S. Cl.
  CPC .................. *G01S 7/4804* (2013.01)

(58) Field of Classification Search
  None
  See application file for complete search history.

(56) References Cited

U.S. PATENT DOCUMENTS

| 10,948,575 B2 * | 3/2021 | Kienzler | G01S 7/4865 |
| 2018/0284278 A1 * | 10/2018 | Russell | G01S 17/26 |

FOREIGN PATENT DOCUMENTS

| AT | 515927 B1 * | 1/2016 | ............ G01S 17/88 |
| DE | 102007013714 A1 | 10/2008 | |
| WO | 03107035 A2 | 12/2003 | |
| WO | 2018152201 A1 | 8/2018 | |

* cited by examiner

*Primary Examiner* — Mark Hellner
(74) *Attorney, Agent, or Firm* — Design IP (57) ABSTRACT

The present disclosure relates to a light detection and ranging (LIDAR) sensor comprising a detector configured to generate a first detector signal at a first delay time following an emission of a first light pulse and to generate at least one second detector signal at the first delay time following an emission of at least a second light pulse; and a processor configured to generate a combined signal for the first delay time based on a combination of the first detector signal and the at least one second detector signal. Depending on the type of combination, the combined signal can be used for interference detection or mitigation.

20 Claims, 7 Drawing Sheets

INTERFERENCE DETECTION AND MITIGATION FOR LIDAR SYSTEMS

FIELD

The present disclosure generally relates to light detection and ranging (LIDAR) systems and, more particularly, to interference detection and/or mitigation for pulsed LIDAR systems.

BACKGROUND

LIDAR refers to a surveying concept that measures distance to a target by illuminating the target with pulsed laser light and measuring the reflected pulses with a light sensitive sensor. Differences in laser return times and wavelengths can then be used to make digital three dimensional (3D) representations of the target. In other words, the range from the light source to the target can be determined based on the time-of-flight (ToF) of the light beam from the source to the sensor. To measure ranges to multiple targets in a field-of-view of the LIDAR system, a laser beam can be scanned in one or two dimensions.

LIDAR sensors are supposed to play an important role for future advanced driving assistance systems (ADAS) and even more for autonomous driving (AD). This is because they allow for a large resolution in both radial and lateral directions. The latter is, for example, much better as for comparable radar sensors. In the coming years, more and more LIDAR sensors are likely to be deployed in vehicles on the streets, due to the miniaturization and cheaper production of these sensors. A downside of this is an increased probability of interference between several LIDAR sensors.

Thus, there is a demand for interference detection and/or mitigation concepts for LIDAR systems.

SUMMARY

This demand is addressed by apparatuses and methods in accordance with the independent claims. Embodiments that can be advantageous in certain scenarios are addressed by the dependent claims.

According to a first aspect, it is provided a LIDAR sensor which comprises a detector circuit configured to generate a first detector signal at a first delay time after an emission of a first light pulse and to generate at least a second detector signal at the same first delay time after an emission of at least a second light pulse. The LIDAR sensor also comprises a processor circuit which is configured to generate a combined signal for the first delay time based on a combination of the first and the at least one second detector signal. In other words, in accordance with various embodiments, multiple detector signals having the same delay time after firing multiple light pulses are combined. The combination can be done in various ways. The combined signal can then be used for further signal processing related to interference detection and/or mitigation.

In the present disclosure, a detector signal may be understood as an electrical signal generated by one or more light sensitive detectors, such as solid state photodetectors (for example, avalanche photodiodes), or photomultipliers. The detector signals may represent noise, light pulses reflected from one or more targets, interference, or a combination thereof. In some example implementations, the detector circuit is configured to generate the first and the at least one second detector signal as respective analog-to-digital converted samples.

In some example implementations, the processor circuit is configured to verify, based on the combined signal, whether the first and the at least one second detector signal correspond to respective reflections of the first and the at least one second light pulse from a target. In other words, the processor can be configured to verify whether the detector signals represent target reflections or not. In such embodiments, the signal combination can be used for interference detection and/or mitigation.

In some example implementations, the processor circuit is configured to low-pass filter the first and the at least one second detector signal to generate the combined signal. In one example, the low-pass filter operation can correspond to an averaging operation and the processor circuit can be configured to compute a mean value of the first and the at least one second detector signal as the combined signal. As averaging is a low-pass operation, it can mitigate individual interference pulses.

In some example implementations, the processor circuit is configured to compute a minimum of the first and the at least one second detector signal as the combined signal. Here, the combination of the plurality of detector signals corresponds to the determination of their minimum value. This is a nonlinear operation and as such may be able to completely eliminate the interference. As a positive side effect, it can also suppress noise since for each sample only the minimum noise contribution is selected.

In some example implementations, the processor circuit is configured to compute a median of the first and the at least one second detector signal as the combined signal. Determining the median is also a nonlinear operation and may be safer than the minimum in some scenarios.

The skilled person having benefit from the present disclosure will appreciate that in addition to or alternatively to the mentioned operations/combinations also other types of combination of the detector signals in the pulse repletion domain may be feasible in order to mitigate interference The skilled person having benefit from the present disclosure will also appreciate that detector signals corresponding to more than one delay time after emission of a respective light pulse may be evaluated. Thus, the detector circuit may be further configured to generate a third detector signal at a second delay time after the emission of the first light pulse and to generate at least a fourth detector signal at the second delay time after the emission of the second light pulse. The processor circuit is further configured to generate a combined signal for the second delay time based on a combination of the third and the at least one fourth detector signal. Hence, the same as for the first delay time may be done for at least a second delay time, which is different from the first delay time. In this way, signal combination and hence interference detection and/or mitigation can be performed for multiple delay times. The processor circuit can be configured to verify whether the third and the at least one fourth detector signal correspond to respective reflections of the first and the at least one second light pulse from a target based on the combined signal for the second delay time. In other words, the processor circuit can be configured to verify whether the detector signals corresponding to the second delay time represent target reflections or not.

In some example implementations, an upper bound for the first and/or the second delay time corresponds to a time between consecutive emissions of light pulses. The light pulses may be emitted to and/or received from the same direction. Hence, a maximum of the sampling window is not greater than the time between two consecutive light pulse emissions (e.g. in the same direction).

In some example implementations, a number of light pulses (emitted in the same direction) can be a frame of light pulses. The detector circuit can be configured to generate a respective detector signal at each of a plurality of different delay times after the emission of a first light pulse of the frame and to generate a respective detector signal at each of the plurality of different delay times after the emission of a second light pulse of the frame. A number of the different delay times may be at least 100. The processor is configured to generate respective combined signals for each of the plurality of different delay times based on a combination of the respective detector signals. Thus, the combination can be done in at least 100 different delay time intervals, i.e., the sampling window can be split into at least 100 different time intervals and for each of the time intervals the combining can be done.

In some example implementations, the processor is configured to combine a first plurality of detector signals. The first plurality of detector signals includes the first detector signal and the second detector signal. Each of the first plurality of detector signals is generated at the first predetermined time delay after emission of a respective light pulse of a first plurality of emitted light pulses. The first plurality of emitted light pulses includes the first light pulse and the second light pulse. A number of the first plurality of emitted light pulses for generating the combined signal can be in a range between 2 and 64, for example.

In some example implementations, each of the first plurality of emitted light pulses are light pulses emitted in a first light pulse emission direction. Hence, the emitted light pulses on which the first plurality of detector signals are based on are transmitted only in this direction.

In some example implementations, each of the first plurality of detector signals are based on light signals received from a same receiving direction.

In some example implementations, each of the first plurality of detector signals are based on light signals received from a first light receiving direction and light receiving directions adjacent to the first direction. In this way, incoming light with directional spread detected by adjacent pixels can be handled together. In this case, each of the first plurality of signals is based on a combination of signals from multiple light detector pixels, the signals of the multiple light detector pixels corresponding to light received from the first light receiving direction and light receiving directions adjacent of the first light receiving direction.

In some example implementations, each of the first plurality of emitted light pulses are light pulses emitted in a first light pulse emission direction and light pulse emission directions adjacent to the first light pulse emission direction. In this way, outgoing light with a certain directional spread can be handled together.

In some example implementations, the plurality of emitted light pulses are transmitted within a single frame of light pulses, the single frame having a frame time interval in the range between 20 ms and 60 ms.

In some example implementations, the processor circuit is configured to detect the presence of a target if one or more of a set of predefined criteria are met. For example, the processor circuit may be configured to detect the presence of the target if an amplitude or a power of the combined signal exceeds a predefined threshold.

In some example implementations, the processor circuit can be configured to detect the presence of an interferer based on the combined signal. For example, the processor circuit can be configured to compute a measure of a variation (such as variance or standard deviation) between the first and the at least one second detector signal as the combined signal. The processor can then be configured to detect the presence of an interferer if the variation (e.g., variance or standard deviation) exceeds a predefined threshold.

According to a second aspect of the present disclosure it is provided a LIDAR sensor comprising a detector circuit which is configured to generate a first detector sample at a first delay time after an emission of a first light pulse, and to generate at least a second detector sample at the first delay time after an emission of at least a second light pulse. The LIDAR sensor also comprises a processor circuit which is configured to measure a variation between the first and the at least one second detector sample, and to detect the presence of an interferer if the variation exceeds a predefined threshold.

In some example implementations, the processor circuit is configured to determine the standard deviation and/or the variance of the first and the at least one second detector sample.

According to a third aspect of the present disclosure it is provided LIDAR sensor comprising a detector circuit which is configured to generate a first detector sample at a first delay time after an emission of a first light pulse, and to generate at least a second detector sample at the first delay time after an emission of at least a second light pulse. The LIDAR sensor also comprises a processor circuit configured to low-pass filter a sequence of the first and the at least one second detector sample to generate a low-pass filtered signal for the first delay time, and to detect the presence of a target if the low-pass filtered signal exceeds a predefined threshold.

In accordance with another aspect of the present disclosure, a LIDAR method includes emitting a first light pulse of a sequence of light pulses, generating a first detector signal at a first delay time after emitting the first light pulse, emitting at least a second light pulse of the sequence of light pulses, generating a second detector signal at the first delay time after emitting the second light pulse, and combining the first and the at least one second detector signal to generate a combined signal for the first delay time.

Some embodiments of the present disclosure propose performing a filtering operation over the pulse repetition domain, exploiting a coherence of target reflections and an incoherence of interference in this domain. Thus, the typical nature or interference can be used to potentially completely mitigate it.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

LIDAR systems are active remote sensing systems that can be used to measure the range from a (light-)source to one or more targets. A LIDAR uses a light beam, typically a laser beam, to illuminate the one or more targets. Compared with other light sources, a laser beam may propagate over long distances without spreading significantly, and can be focused to small spots so as to deliver high optical power densities over long distance and provide fine resolution. The laser beam may be modulated such that the transmitted laser beam includes a series or a frame of pulses. The transmitted laser beam may be directed to a target, which may reflect the transmitted laser beam. The laser beam reflected from the target can be measured, and the time-of-flight (ToF) from the time a pulse of the transmitted light beam is transmitted from the source to the time the pulse arrives at a detector near the source or at a known location may be measured. The range from the source to the target may then be determined by, for example, $r=c \cdot t/2$, where r is the range from the source to the target, c is the speed of light in free space, and t is the ToF of the pulse of the light beam from the source to the detector.

Figure 1:
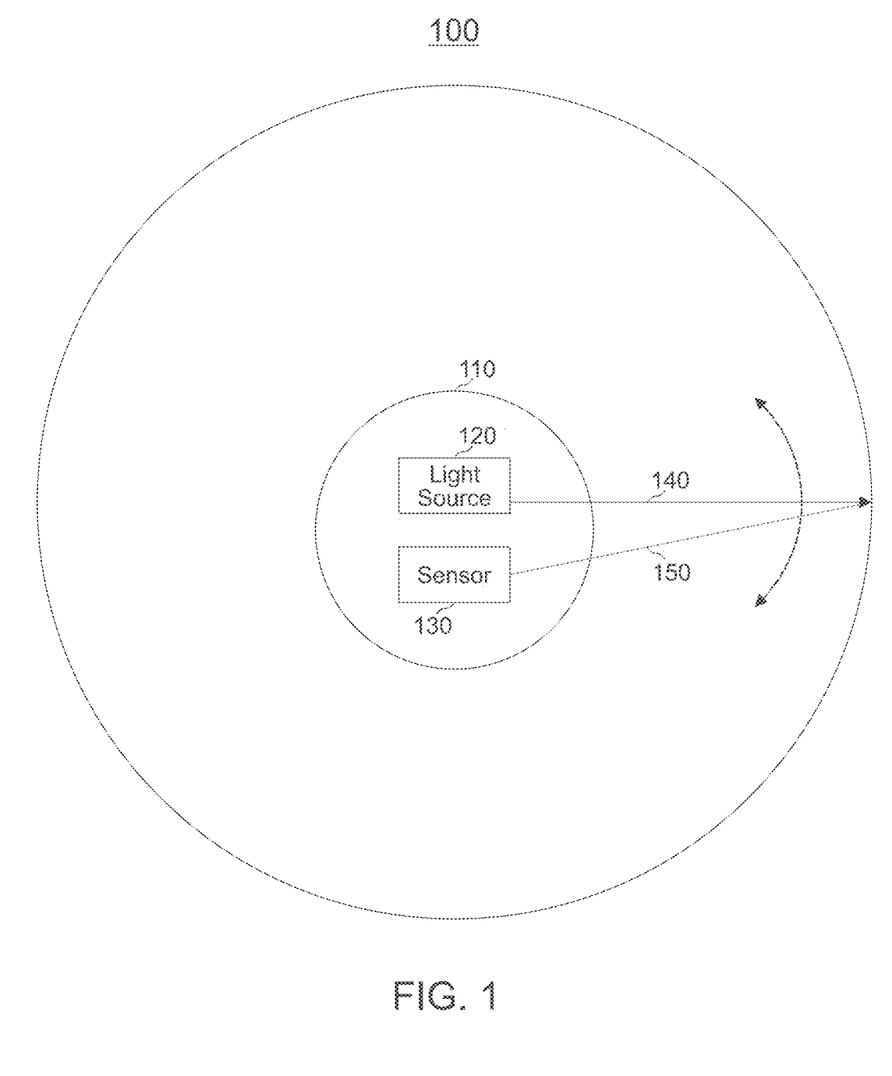
FIG. 1 shows a simplified block diagram of an example LIDAR system.

FIG. 1 shows a simplified block diagram of an example LIDAR system 100. System 100 may include a scanning platform 110 that may be used to scan the laser beam in different azimuthal and/or elevational directions. Scanning platform 110 may include a light source 120 and a sensor/detector 130. Light source 120 may emit a light beam 140 toward a target object, which may reflect a portion of light beam 140 as a reflected beam 150. The reflected beam 150 may then be collected and detected by sensor/detector 130.

Light source 120 may include an optical source, such as a laser, a laser diode, a vertical cavity surface-emitting laser (VCSEL), a light-emitting diode (LED), or other optical source. The laser may be, for example, an infrared pulsed fiber laser or other mode-locked laser with an output wavelength of, for example, 930-960 nm, 1030-1070 nm, around 1550 nm, or longer.

Sensor 130 may include a light sensitive detector, or array of detectors (also sometimes referred to as pixels), each having a working (sensitive) wavelength comparable with the wavelength of the light source 120. The detector may be a high speed photodetector, for example, a PIN photodiode with an intrinsic region between a p-type semiconductor region and an n-type semiconductor region, or an InGaAs avalanche photodetector (APD). In some systems, sensor 130 may include a silicon photomultiplier (SiPM) sensor.

Scanning platform 110 may use many different types of beam scanning mechanisms, for example, a rotating platform driven by a motor, a multi-dimensional mechanical stage, a Galvo-controlled mirror, a microelectromechanical (MEMS) mirror driven by micro-motors, a piezoelectric translator/transducer using piezoelectric material such as a quartz or lead zirconate titanate (PZT) ceramic, an electromagnetic actuator, or an acoustic actuator. Scanning platform 110 may be a platform without mechanical movement of any component, for example, using a phased array technique where phases of laser beams from lasers in a one-dimensional (1-D) or two-dimensional (2-D) laser array may be modulated to alter the wavefront of a superimposed laser beam.

As scanning platform 110 points light beam 140 at different directions using any beam scanning mechanism, such as the scanning mechanism described above, light beam 140 may illuminate different targets or different locations of a target object during the scanning. During the scanning, reflected beam 150 from the different target objects or different locations of the target may be collected and detected by sensor 130 to generate detector signals, which may then be used by an analyzer or a processor to determine the characteristics of the target objects, such as their distances from system 100 and their reflective properties, or generate an image of the scanned area. When scanning platform 110 revolves one round, LIDAR system 100 may perform measurements of a "slice" of the surrounding environment.

To achieve a 3-dimensional (3-D) scanning of the environment, a LIDAR system may use either multiple sets of lasers/detectors or a 2-D scanning mechanism, such that the overall system can scan not only in one plane as shown in FIG. 1, but also in a plurality of different planes.

In a non-interfered operation, light source 120 emits a laser pulse which is reflected at an object in the environment and travels back to the sensor 130. There it is received and the resulting detector signal is processed to obtain an estimate of the distance to the object in the direction in which the light pulse was emitted. If the Signal-to-Noise Ratio (SNR) is large enough, the pulse can be detected as a peak in the detector signal. However, if another LIDAR sensor is present in the same environment, its emitted laser beam could directly illuminate sensor 130 and lead to possibly large pulses in the detector signals that are not related to any meaningful object reflections. Therefore, these pulses in the received signal can lead to so-called "ghost targets", i.e., detections of objects/targets that are actually not physically present in the environment. Such detections may cause unintended reactions of the safety system in a car, for example braking. This is clearly safety critical.

Since automotive LIDAR sensors are not yet widely deployed, interference solutions are not yet publicly known or available. However, some general detection/mitigation methods can be characterized as follows:

Pulse Coding:

A LIDAR system may emit a sequence of light pulses which is coded. The received pulses can be correlated with the known code sequence which leads to a mitigation of interference pulses that do not show the pulse sequence. This code can be applied to the transmitted pulse sequence either in the amplitude of the pulses (not preferable, since a transmission at the maximum power is desired in order not to waste any SNR, also a detection is difficult based on the amplitude), the phase (difficult to detect, since a coherent receiver would be required) or the time delay of the pulses. Generally, an increase of the measurement time is a direct consequence that is proportional to the length of the code. The code length also directly results in the number of different code sequences, i.e. the number of sensors that are uniquely identifiable. The larger measurement time is partly compensated by a processing gain that is obtained by the combination of the different pulses.

Random Wait Time Between Pulses:

This might decrease a probability of interference while complicating the implementation.

Embodiments of the present disclosure assume a LIDAR sensor that for every detector pixel acquires more than one, typically a sequence or a frame of $N_p$ signals where each signal corresponds to a light pulse emitted at a specific time. This is depicted in detector sample plot 200 of FIG. 2.

Figure 2:
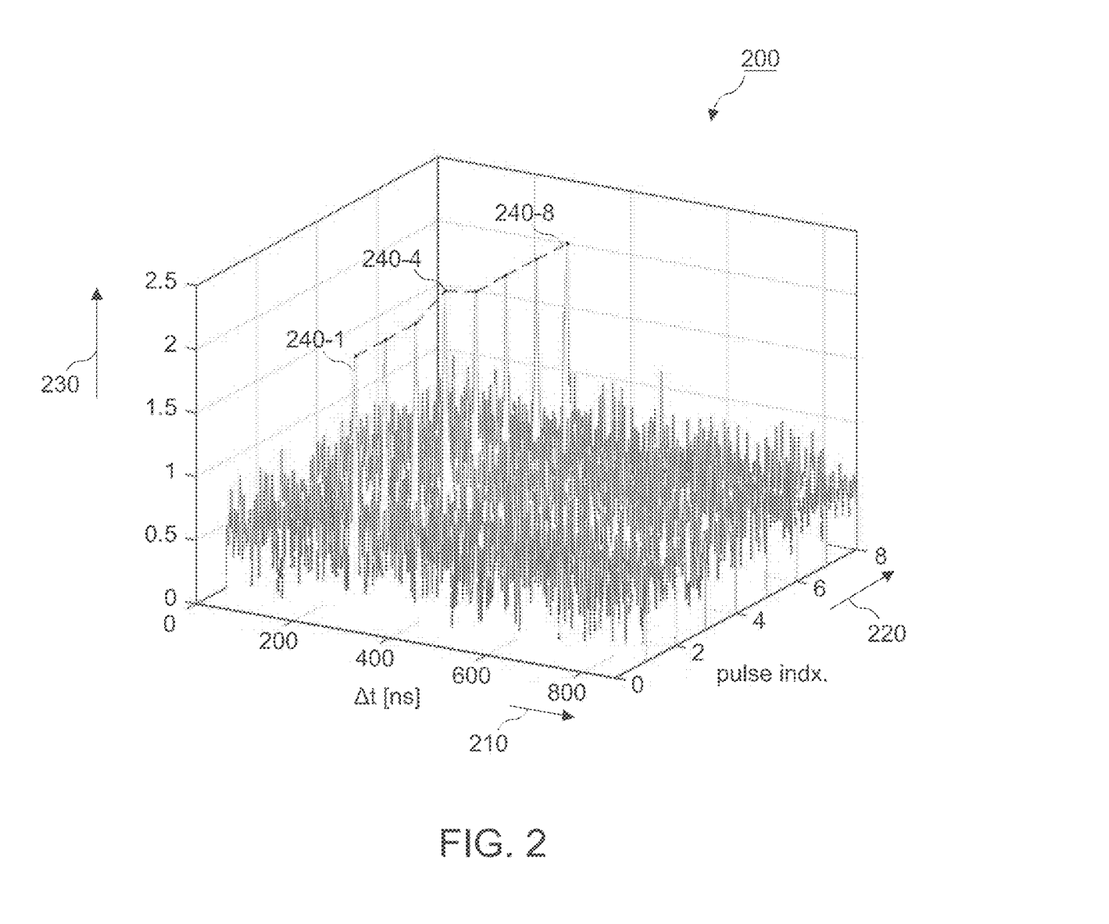
FIG. 2 shows eight consecutive detector samples in one pixel channel without interference.

A first axis 210 of detector sample plot 200 represents a (delay) time $\Delta t$ after an emission of a light pulse from the light source 120 at $\Delta t=0$. The light pulse may be emitted in a specific azimuthal and/or elevational direction in some embodiments. In the illustrated example, the delay time reaches from 0 ns up to approximately $\Delta t_{max}=850$ ns. $\Delta t=0$ corresponds to the emission time of the light pulses. $\Delta t_{max}$ corresponds to a maximum time of flight which is linked to a maximum distance according to $r_{max}=c \cdot \Delta t_{max}/2$. It is to be noted that the selected number of $\Delta t_{max}=850$ ns is only one of many possible numbers. The temporal resolution, i.e. the temporal separation of adjacent samples on the delay time axis 210, is application- and/or hardware-specific. For example, delay time axis 210 can comprise 100 or more samples (or temporal bins). The skilled person having benefit from the present disclosure will appreciate that the number of samples or bins of delay time axis 210 determines the sampling resolution of the system. The more discrete bins, the finer the range resolution.

A second axis 220 of detector sample plot 200 represents a light pulse index. In the illustrated example, a frame of consecutive light pulses (e.g., emitted in the same direction) comprises $N_p=8$ light pulses which can be processed to obtain the combined signal. In general, a frame of light pulses can have more or less (at least two) light pulses than the illustrated example, depending on the application and/or the environment of the LIDAR system. For example, according to some embodiments, the number $N_p$ might be a number selected from a range of 8 or more, 16 or more, 32 or more or 64 or more.

A third axis 230 of detector sample plot 200 represents an amplitude or power of the respective detector signals.

In the example of a scanning LIDAR sensor with a swinging or rotating mirror to steer the laser beam 140, the $N_p$ pulses of a frame can be acquired when the mirror is at the same respective position for the corresponding detector pixel. This can be done to improve the SNR by averaging over the $N_p$ detector pulses. However, according to embodiments of the present disclosure the acquisition of multiple detector pulses can also be used to detect and mitigate interfering light pulses. Looking at FIG. 2 reveals that the detected target peaks 240 related to an actual or real target are associated with a rather constant delay time, i.e. are present at approximately the same time index (corresponding to the round trip distance) and have similar amplitudes over the $N_p$ pulses. This assumes that the target object moves at a sufficiently low velocity such that its travel distance over the $N_p$ pulses does not exceed the range resolution of the system. In the illustrated example, the target peaks 240 are located at a delay time of $\Delta t \approx 270$ ns after an emission of a respective light pulse of the frame, corresponding to a distance of approximately 40 m from the scanning platform 110.

Figure 3:
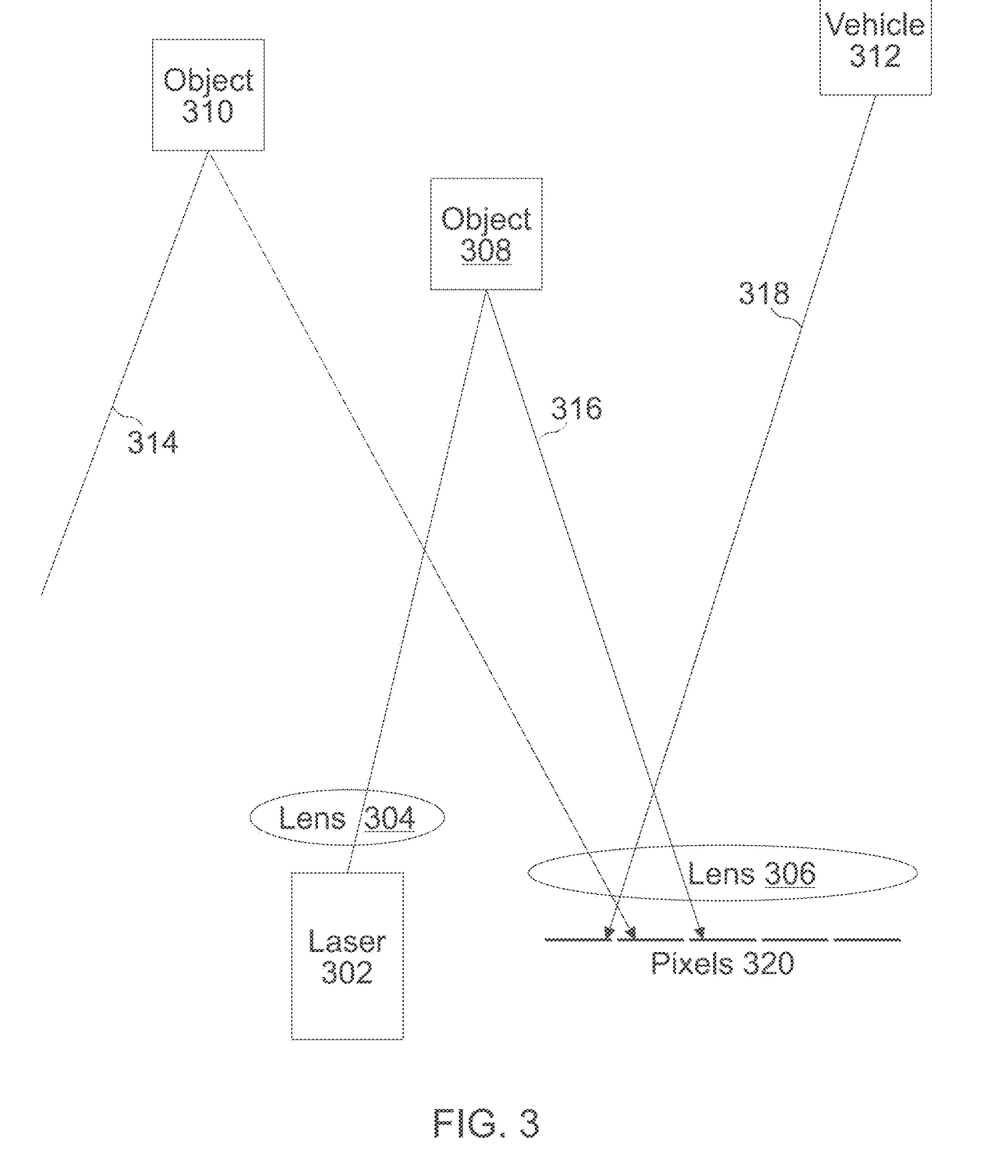
FIG. 3 illustrates an example LIDAR interference scenario.

FIG. 3 schematically illustrates an interference scenario. As shown in FIG. 3, laser 302 fires a laser beam 316 through lens 304 onto target 308. The beam 316 is reflected by target 308 through lens 306 onto an array of pixels 320. However, as shown in FIG. 3, the pixels 320 are further detecting interference beams 314 and 318, which are indirectly and directly received from other sources, e.g., reflected off of object 310 (indirect interferer) or transmitted by vehicle 312 (direct interferer). In some embodiments, the interference beams 314 and 318 will lead to incorrect results ("ghost targets") from the LIDAR system. The skilled person having benefit from the present disclosure will appreciate that FIG. 3 is not drawn to scale and that in other embodiments the operation of the light source, lenses, pixels, and other objects may be different than shown in FIG. 3. For example, the lenses may invert the location of detected objects and ether may be a larger array of pixels than shown in FIG. 3. Further, in some embodiments, there may be more pixels than shown in FIG. 3.

Figure 4:
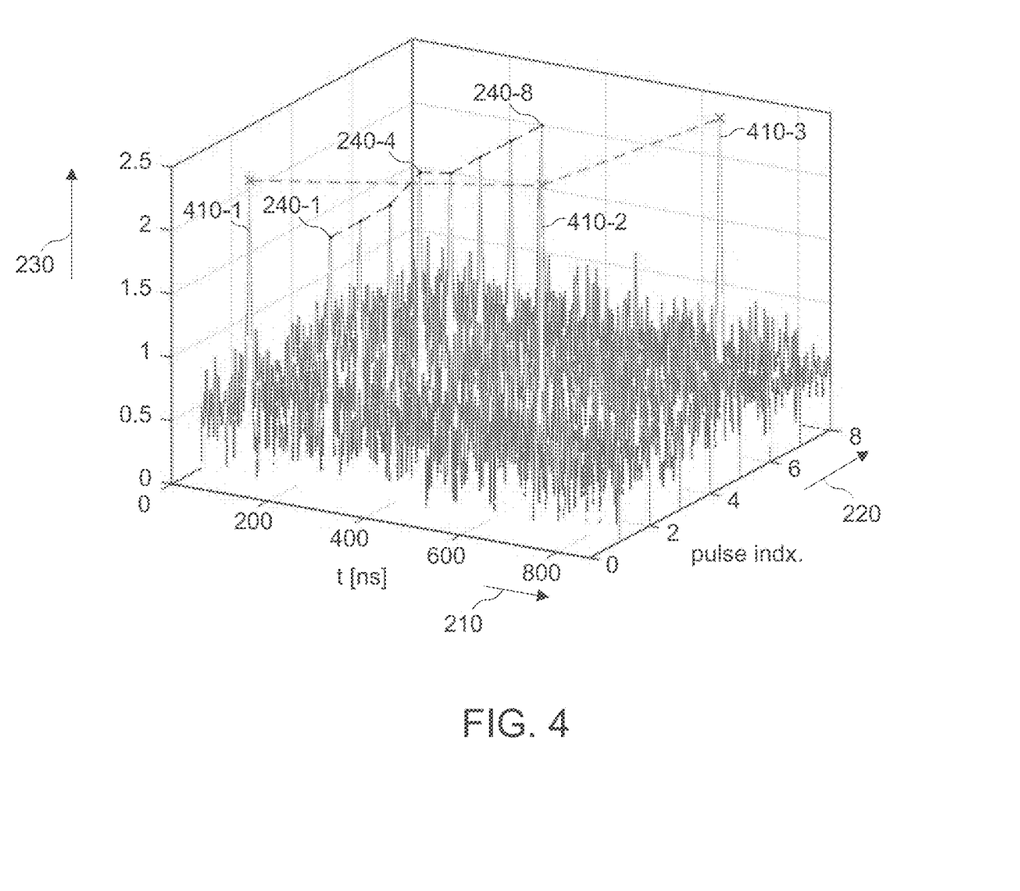
FIG. 4 shows eight consecutive detector samples in one pixel channel with interference.

Pulses of an interfering LIDAR system will most likely not be synchronized with the sensor such that corresponding detected ghost pulses will appear at apparently random positions in the received signals, which is schematically shown in the example sample plot of FIG. 4. Here, some individual detected ghost pulses 410-1, 410-2, 410-3 corresponding to ghost targets (interferers) at different delay times and pulse index positions are shown.

The present disclosure proposes to exploit the relative coherence of the object-related pulses 240 over the pulse repetitions of a pulse frame. Any (linear or non-linear) low-pass like filtering operation may reduce the contributions of interference-related pulses since they represent high frequency disturbances when viewed along the pulse repetitions.

Figure 5:
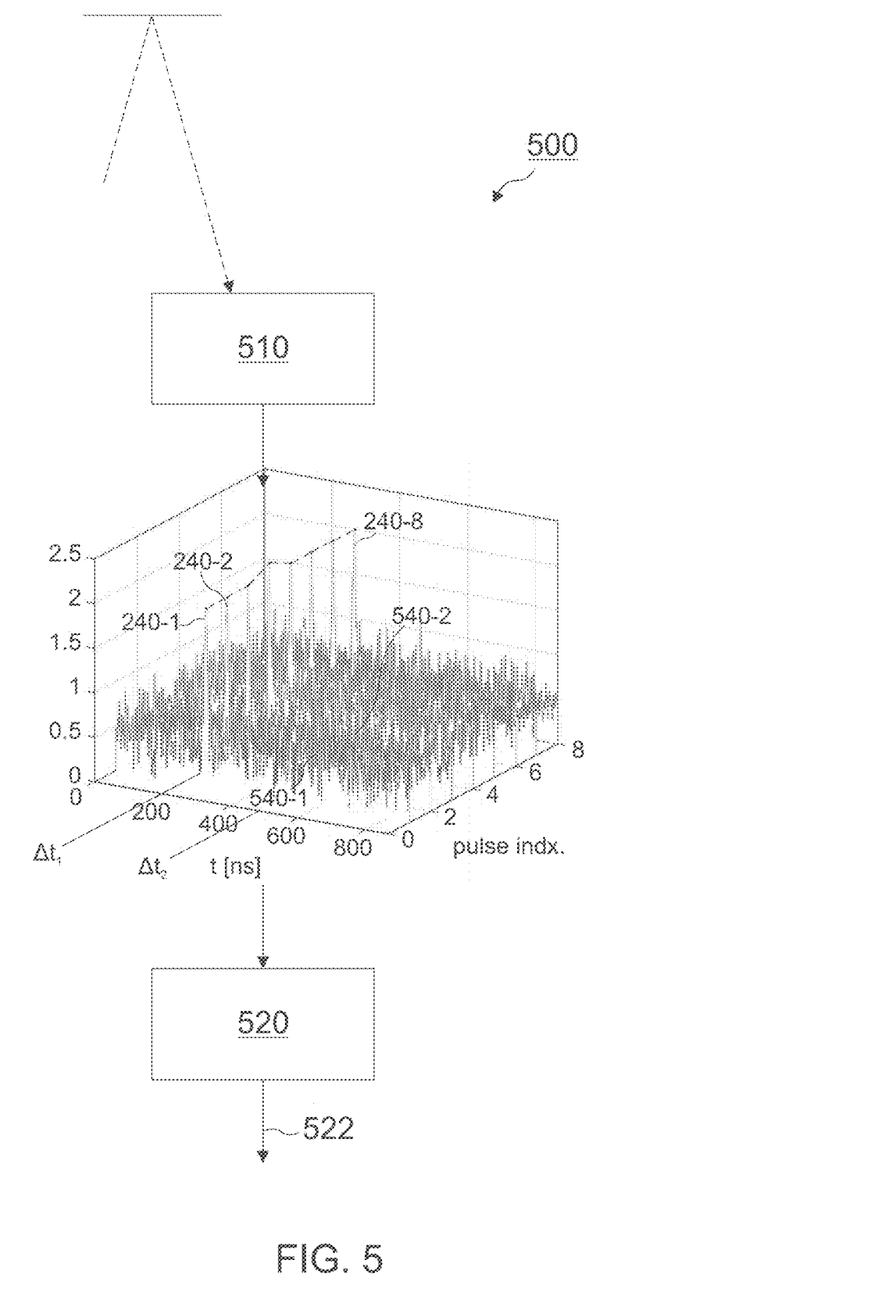
FIG. 5 shows a block diagram of a LIDAR sensor according to an embodiment.

FIG. 5 schematically illustrates a LIDAR sensor 500 according to an embodiment.

LIDAR sensor 500 comprises a light sensitive detector circuit 510 configured to output a plurality of detector signals including a first detector signal 240-1 for a first delay time $\Delta t_1$ after an emission of a first light pulse (e.g., pulse index 1) and to output at least a second detector signal 240-2 for the same first delay time $\Delta t_1$ after an emission of at least a second light pulse (e.g., pulse index 2). The first and second light pulses may be consecutive or even non-consecutive light pulses from pulse repetitions within a pulse frame. That is to say, the detector signals 240-1, 240-2 are received from a same direction (e.g. by a same pixel) and correspond to a same delay time bin $\Delta t_1$ but are located at different pulse indices along the pulse index axis (are associated with different light pulse transmissions).

In some embodiments, the first light pulse and the at least one second light pulse can be emitted essentially in the same direction, for example during subsequent revolutions of a scanning LIDAR. In some embodiments, the first light pulse and the at least one second light pulse are light pulses received essentially from a same direction.

The detector circuit 510 can comprise one or more light sensitive pixels converting light to electrical signals and converting the electrical signals from analog to digital domain. Thus, the detector signals 240, 540 can correspond to digital signal samples from one or more solid state photodetectors or photomultipliers.

LIDAR sensor 500 also comprises processor circuitry 520 which is configured to generate a combined signal 522 for the first delay time $\Delta t_1$ based on a combination of the first and the at least one second detector signal 240-1, 240-2. The combined signal 522 can be obtained in various possible ways, depending on whether interference detection or interference mitigation is desired. The skilled person having benefit from the present disclosure will appreciate that according to some embodiments more than two detector signals per delay time $\Delta t$ are combined, such as $N_p=32$, $N_p=64$ or $N_p=128$, for example.

The skilled person having benefit from the present disclosure will appreciate that the block diagram 500 can also be interpreted as a flow chart of a corresponding LIDAR method. In this case, reference numeral 510 would denote acts of generating a first detector signal at a first delay time after emitting a first light pulse and generating a second detector signal at the first delay time after emitting a second light pulse. Reference numeral 520 would then denote an act of combining the first and the at least one second detector signal to compute the combined signal 522 for the first delay time.

The combined signal 522 can be generated for some or all discrete delay times in the delay time window reaching from 0 to $\Delta t_{max}$, thereby moving through all possible discrete ranges up to the maximum range. To this end, the detector circuit 510 can be configured to generate a third detector signal 540-1 at a second delay time $\Delta t_2$ after the emission of the first light pulse (e.g., pulse index 1) and to generate at least a fourth detector signal 540-2 at the second delay time $\Delta t_2$ after the emission of the second light pulse (e.g., pulse index 2). The processor circuit 520 can be configured to generate a combined signal 522 for the second delay time $\Delta t_2$ based on a combination of the third and the at least one fourth detector signal. In the illustrated example, the detector signal samples 540-1 and 540-2 represent only noise samples instead of any useful reflections or interference.

The skilled person having benefit from the present disclosure will appreciate that processor circuit 520 can be configured to generate a respective combined signal (combined along pulse repetition index) for all discrete delay times $\Delta t$ in the delay time window from 0 ns to $\Delta t_{max}$. In other words, if a frame comprises a plurality of $N_p$ light pulses (emitted in the same direction and/or received from a same direction), the detector 510 can be configured to generate a respective detector signal at each of a plurality of different discrete delay times $\Delta t$ after the emission of a first light pulse (e.g., pulse index 1) of the frame and to generate a respective detector signal at each of the plurality of different delay times after the emission of a second light pulse (e.g., pulse index 2) of the frame. A number of the different delay times may be at least 100. The processor 520 can be configured to generate respective combined signals for each of the plurality of different delay times based on a combination of the respective $N_p$ detector signals associated with one delay time $\Delta t$. Thus, the combination along pulse repetition can be done for at least 100 different delay time intervals. To this end, the sampling or delay time window [0; $\Delta t_{max}$] can be split into at least 100 different time intervals and for each of the time intervals the combining along the pulse index axis can be done.

In some example implementations, an upper bound $\Delta t_{max}$ for the first delay time $\Delta t_1$ and/or the second delay time $\Delta t_2$ corresponds to a time between consecutive emissions of light pulses within a pulse frame. The skilled person having benefit from the present disclosure will appreciate that $\Delta t_{max}$ will depend on the application and the implementation of the LIDAR system. For example, it can depend on a rotation frequency of a scanning mirror.

In some example implementations, the processor 520 is configured to low-pass filter the first and the at least one second detector signals 240-1, 240-2 (540-1, 540-2) to generate the combined signal 522. In one example, the low-pass filter operation can correspond to an averaging operation and the processor 520 can be configured to compute an arithmetic mean value of the first and the at least one second detector signals 240-1, 240-2 (540-1, 540-2) as the combined signal 522. This averaging operation is a low-pass operation and will mitigate the interference pulses to some extent. Furthermore, for signals not influenced by interference, the SNR is also improved by this operation. At the corresponding time instances of the interference pulses some remaining contributions of the interference may still be present. The mitigation performance (and in general the averaging gain) depends on $N_p$. If the estimated mean for N detector signal samples $(x_1, \ldots, x_N)$ is denoted as $\hat{\mu}_N$, an online estimate for the mean can be computed according to $$\hat{\mu}_N = \hat{\mu}_{N-1} + \frac{1}{N}(x_N - \hat{\mu}_{N-1}).$$

Additionally, or alternatively, the processor 520 can be configured to compute a minimum of the first and the at least one second detector signals 240-1, 240-2 as the combined signal. Hence, the combination of the detector signals 240, 540 along the pulse repetition can also be a determination of their minimum value $\min(x_1(\Delta t), \ldots, x_{N_p}(\Delta t))$. This is a nonlinear operation and as such is able to completely eliminate the interference. As a side effect, it can also suppress the noise since for each sample, only the minimum noise contribution is selected. As this of course also applies to the detector signal corresponding to the target, the target peak is also reduced to the minimum over the pulses.

Additionally, or alternatively, the processor 520 can be configured to compute a median of the first and the at least one second receive signal as the combined signal. The median is known to be the middle value separating the greater and lesser halves of a data set $(x_1(\Delta t), \ldots, x_{N_p}(\Delta t))$. Determining the median is also a nonlinear operation, but maybe safer than the minimum. It is noted again that for a sequence comprising $N_p$ pulses, the above operations (filtering, mean, minimum, median etc.) may be applied to all $N_p$ detector signals rather than only the first and second detector signal.

Figure 6:
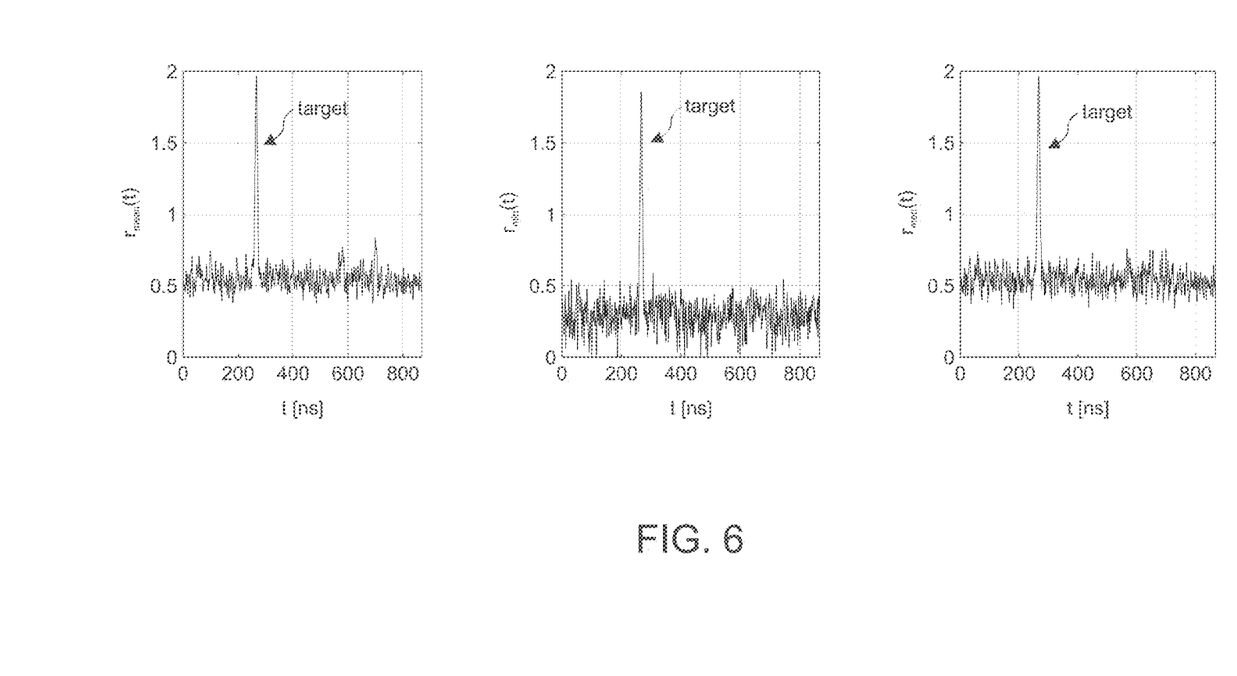
FIG. 6 shows different detector sample combination options: Mean (left), minimum (middle), median (right)

A comparison of the different combining options (mean, minimum, and median) is illustrated in FIG. 6. Here, it can be seen that the computation of the detector signal minimum (center figure) along the pulse repetition axis 220 leads to a rather low noise floor along the time axis 210 compared to mean (left) and median (right). The skilled person having benefit from the present disclosure will appreciate that other filtering operations can be applied to obtain a combined signal having low-pass filtered characteristics.

In some example implementations, the processor 520 can be configured to detect the presence of a target if one or more of a set of predefined criteria are met. For example, the processor may be configured to detect the presence of the target object if an amplitude of the combined 522 signal exceeds a predefined threshold value. In the examples of FIG. 6, the threshold value could be set to 1, for example. In this case, reliable decisions could be made on whether the combined signal indicates a target or not. All three combining options would detect the target at approx. $\Delta t=270$ ns.

Figure 7:
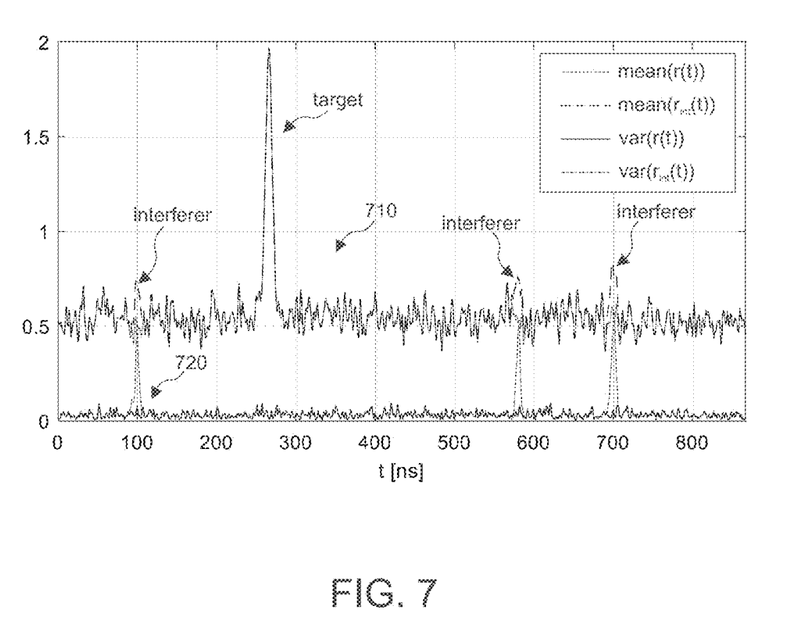
FIG. 7 shows the mean of received signals without and with interference as well as the variance over $N_p$ pulses without and with interference.

On the other hand, the processor 520 can additionally or alternatively be configured to detect the presence of an interferer based on the combined signal. In this case, the detector signals can be combined according to an interference detection scheme along the pulse repetition. For example, the processor can be configured to compute a measure of a variation, such as the variance or the standard deviation, between the first and the at least one second detectors signal along the pulse repetitions as the combined signal 522. FIG. 7 shows a plot including the mean values $\mu(\Delta t)$ 710 along the pulse repetitions as well as the detector signal variance $\text{var}(\Delta t)$ 720 along the pulse repetitions. It can be seen that $\text{var}(\Delta t)$ can be used as an indicator for interferers at $\Delta t=100$ ns, $\Delta t=580$ ns, and $\Delta t=700$ ns, which can hardly be identified based on $\mu(\Delta t)$.

Hence, in some example implementations $N_p$ consecutive pulses along the pulse repetitions can be detected for one or more pixels to be able to carry out interference detection and/or mitigation. Calculating the variance along the pulse repetition allows to detect interference peaks. In order to avoid storing all $N_p$ pulses for all delay times $\Delta t$, an online estimator can be used instead to estimate the variance. An algorithm for an online estimation of the variance $\sigma_N^2$ of N samples using the online mean estimation would be:

Define $S_N = N\sigma_N^2$ $S_N - S_{N-1} = \ldots = (x_N - \hat{\mu}_{N-1})(x_N - \hat{\mu}_N)$ $S_N = S_{N-1} + (x_N - \hat{\mu}_{N-1})(x_N - \hat{\mu}_N)$ The online estimate for the variance can be computed according to $$\hat{\sigma}_N^2 = \frac{S_N}{N}.$$

The processor 520 can then be configured to detect the presence of an interferer if the variance $\sigma_N^2$ exceeds a predefined threshold. The skilled person having benefit from the present disclosure will appreciate that this threshold will depend on the application and/or the LIDAR environment.

So far it has been assumed that an object causing a reflected pulse does not move more than the range resolution within the duration of a pulse frame. However, if the object moves faster, the reflected pulse peak locations may appear in adjacent time bins along the pulse repetitions. To account for such fast target movements at a speed of $v_{max}$ relative to the LIDAR system 500, a maximum allowed pulse spacing $\Delta\tau_{max}$ on the time axis 210 can be defined. The maximum allowed pulse spacing $\Delta\tau_{max}$ indicates a range in which detected peaks of a same object are allowed to be distributed over one pulse frame. If $T_{rep}$ denotes the total time for the transmission of $N_p$ pulses (i.e., frame time interval), then $\Delta\tau_{max}$ can be determined according to $\Delta\tau_{max}=2/c \cdot T_{rep} \cdot v_{max}$. For example, if the frame time interval $T_{rep}$ is 40 ms and $v_{max}=400$ km/h (e.g., two cars approaching each other with 200 km/h, respectively), $\Delta\tau_{max}$ is calculated to be 30 ns. This corresponds to a change of the delay times of reflected pulses by 30 ns on the time axis 210 within one frame. Only pulses outside this delay spread of 30 ns may then be identified as ghost targets.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A light detection and ranging (LIDAR) sensor, comprising:
   a detector configured to generate a first detector signal at a first delay time following an emission of a first light pulse and to generate at least one second detector signal at the first delay time following an emission of at least one second light pulse, wherein the detector is configured to generate a third detector signal at a second delay time following the emission of the first light pulse and to generate at least one fourth detector signal at the second delay time following the emission of the second light pulse; and
   a processor configured to generate a first combined signal for the first delay time based on a combination of the first detector signal and the at least one second detector signal and generate a second combined signal for the second delay time based on a combination of the third detector signal and the at least one fourth detector signal.

2. The LIDAR sensor of claim 1, wherein the processor is configured to verify, based on the first combined signal for the first delay time, whether the first detector signal and the at least one second detector signal correspond to respective reflections of the first light pulse and the at least one second light pulse from a target.

3. The LIDAR sensor of claim 1, wherein the processor is configured to verify, based on the second combined signal for the second delay time, whether the third detector signal and the at least one fourth detector signal correspond to respective reflections of the first light pulse and the at least one second light pulse from the target.

4. The LIDAR sensor of claim 1, wherein an upper bound for the first delay time and the second delay time corresponds to a time between consecutive emissions of light pulses.

5. The LIDAR sensor of claim 1, wherein the processor is configured to low-pass filter the first detector signal and the at least one second detector signal to generate the first combined signal.

6. The LIDAR sensor of claim 1, wherein the processor is configured to compute a mean value of the first detector signal and the at least one second detector signal as the first combined signal.

7. The LIDAR sensor of claim 1, wherein the processor is configured to determine the first combined signal as a minimum detector signal selected from the first detector signal and the at least one second detector signal.

8. The LIDAR sensor of claim 1, wherein the processor is configured to compute a median of the first combined signal and the at least one second detector signal as the first combined signal.

9. The LIDAR sensor of claim 1, wherein the processor is configured to detect a presence of a target if one or more of a set of predefined criteria are met.

10. The LIDAR sensor of claim 9, wherein the processor is configured to detect the presence of the target if an amplitude of the first combined signal exceeds a predefined threshold.

11. The LIDAR sensor of claim 1, wherein the processor is configured to detect a presence of an interferer based on the first combined signal.

12. The LIDAR sensor of claim 1, A light detection and ranging (LIDAR) sensor, comprising:
    a detector configured to generate a first detector signal at a first delay time following an emission of a first light pulse and to generate at least one second detector signal at the first delay time following an emission of at least one second light pulse; and
    a processor configured to generate a first combined signal for the first delay time based on a combination of the first detector signal and the at least one second detector signal,
    wherein the processor is configured to measure a variation between the first detector signal and the at least one second detector signal as the first combined signal.

13. The LIDAR sensor of claim 12, wherein the processor is configured to detect the presence of an interferer if the variation exceeds a predefined variation threshold.

14. A light detection and ranging (LIDAR) sensor, comprising:
a detector configured to:
generate a first detector signal sample at a first delay time following an emission of a first light pulse, and
generate at least one second detector signal sample at the first delay time following an emission of at least one second light pulse; and a processor configured to:
measure a variation between the first detector signal sample and the at least one second detector signal sample, and
detect a presence of an interferer if the variation exceeds a predefined threshold.

15. The LIDAR sensor of claim 14, wherein the processor is configured to determine at least one of a standard deviation or a variance of the first detector signal sample and the at least one second detector signal sample.

16. A light detection and ranging (LIDAR) sensor, comprising:
a detector configured to:
generate a first detector signal sample at a first delay time following an emission of a first light pulse, and
generate at least one second detector signal sample at the first delay time following an emission of at least a second light pulse; and a processor configured to:
low-pass filter a sequence of the first detector signal sample and the at least one second detector signal sample to generate a low-pass filtered signal for the first delay time, wherein an amplitude of the low-pass filtered signal has a mean amplitude value of the first detector signal sample and the at least one second detector signal sample, or the amplitude of the low-pass filtered signal has a minimum amplitude value of the first detector signal sample and the at least one second detector signal sample, or the amplitude of the low-pass filtered signal has a median amplitude value of the first detector signal sample and the at least one second detector signal sample, and
detect a presence of a target if the amplitude of the low-pass filtered signal exceeds a predefined threshold.

17. A light detection and ranging (LIDAR) method, comprising:
emitting a first light pulse of a sequence of consecutive light pulses;
generating a first detector signal at a first delay time following emitting the first light pulse;
emitting at least one second light pulse of the sequence of consecutive light pulses;
generating a second detector signal at the first delay time following emitting the second light pulse;
measuring a variation between the first detector signal and the at least one second detector signal; and
detecting a presence of an interferer if the variation exceeds a predefined threshold.

18. The LIDAR sensor of claim 16, wherein the detector is configured to measure a variation between the first detector signal and the at least one second detector signal and detect a presence of an interferer if the variation exceeds a predefined threshold.

19. The LIDAR sensor of claim 18, wherein the interferer is an interference light beam.

20. The LIDAR sensor of claim 13, wherein the processor is configured to low-pass filter a sequence of the first detector signal sample and the at least one second detector signal sample to generate a low-pass filtered signal for the first delay time and detect a presence of a target if the amplitude of the low-pass filtered signal exceeds a predefined detection threshold.

* * * * *